United States Patent [19]
Farling et al.

[11] Patent Number: 5,903,787
[45] Date of Patent: May 11, 1999

[54] MAGNETIC HEAD APPARATUS WITH GIMBALED LOAD PAD

[75] Inventors: Duane J. Farling, Webster; Thomas D. Jensen, Holley; Paul L. Taillie, Rochester, all of N.Y.

[73] Assignee: Eastman Kodak Company, Rochester, N.Y.

[21] Appl. No.: 09/065,716

[22] Filed: Apr. 24, 1998

[51] Int. Cl.⁶ ............................ G03B 17/24; G11B 15/60
[52] U.S. Cl. ................. 396/320; 360/130.3; 360/130.32
[58] Field of Search .................................. 396/310, 319, 396/320; 355/40; 360/1, 3, 128, 130.1, 130.2, 130.21, 130.3, 130.31, 130.32, 130.33

[56] References Cited

U.S. PATENT DOCUMENTS

| | | | |
|---|---|---|---|
| 5,005,031 | 4/1991 | Kelbe | 396/320 |
| 5,097,278 | 3/1992 | Tamamura et al. | 396/320 |
| 5,274,522 | 12/1993 | Taillie | 360/130.3 |
| 5,307,100 | 4/1994 | Kubo | 396/319 |
| 5,353,078 | 10/1994 | Aoshima | 396/320 |
| 5,477,290 | 12/1995 | Takeshita | 396/319 |
| 5,510,864 | 4/1996 | Hills et al. | 396/319 |
| 5,541,685 | 7/1996 | Jessop | 396/319 |
| 5,576,916 | 11/1996 | Ryan et al. | 360/130.31 |

*Primary Examiner*—Safet Metjahic
*Assistant Examiner*—J. K. Han
*Attorney, Agent, or Firm*—Francis H. Boos, Jr.

[57] ABSTRACT

A gimbaled load pad mounting arrangement in which a rigid load pad is detachably mounted on the spherical end of a spring-loaded mounting shaft. The load pad is provided on the side with flexible retention hooks with finger portions that engage the underside of the mounting frame to hold the load pad in position during assembly. Once the magnetic head is mounted in position, the pressure of the head against the load pad disengages the finger portions from contact with the underside of the frame thereby allowing the gimbaled load pad to assume its exact constraint position against the face of the magnetic head.

3 Claims, 3 Drawing Sheets

MAGNETIC HEAD APPARATUS WITH GIMBALED LOAD PAD

CROSS REFERENCE TO RELATED APPLICATIONS

Cross reference is made to commonly assigned U.S. application Ser. No. 08/627,751 filed Apr. 26, 1996—McGinn et al., entitled RIGID, GIMBALED LOAD PAD TO URGE FILM INTO CONTACT WITH MAGNETIC HEAD which claims priority from Provisional Application 60/000,395 filed Mar. 21, 1995.

FIELD OF THE INVENTION

The invention relates generally to the field magnetic heads and in particular to photographic apparatus employing a rigid gimbaled load pad for urging a magnetic layer formed on photographic film into intimate contact with the magnetic head.

BACKGROUND OF THE INVENTION

In the above cross referenced U.S. patent application, a magnetic head arrangement is disclosed for a photographic camera of the type adapted to read and/or record data on a magnetic film formed on the surface of photographic film. Such cameras are presently commercially available in the Advanced Photo System (APS). As disclosed therein, a rigid, gimbaled load pad is employed to maintain intimate contact between the magnetic layer of the film and the magnetic head mounted in the camera. The load pad arrangement includes a shaft having a spherical end that mates with a socket formed on the underside of the load pad. A compression spring mates with the other end of the shaft to urge the load pad in the direction of the magnetic head. The load pad arrangement is positioned somewhat loosely in a recess formed in the camera frame and when the magnetic head is mounted on the housing over the load pad, the load pad is urged against the head. This gimbaled mounting arrangement provides exact constraint of the pad with the head that allows three degrees of rotational freedom about the pitch, roll, and azimuth axes of the load pad. Although disclosed in the context of a camera, the same magnetic head, load pad arrangement may be used in a variety of photograph apparatus requiring the reading and/or writing of magnetic data form or onto photographic film magnetic layer. For example, it may be employed in small, portable or computer mounted film scanners.

While quite effective for its intended purpose of providing effective and reliable contact between the film magnetic layer and the magnetic head, the disclosed arrangement presents some difficulties with manufacturing of cameras and scanners embodying magnetic read and/or write heads.

SUMMARY OF THE INVENTION

Thus there is provided in accordance with the invention a gimbaled load pad mounting arrangement which comprises a frame having an aperture therein, a load pad assembly positioned in the aperture and means on the underside of the frame for supporting the load assembly in the aperture. The load pad assembly includes a rigid load pad having an upper surface adapted for engagement with a magnetic head and a lower surface with a socket formed therein. The load pad assembly further includes a pad mounting shaft having a spherical end positioned in the socket of the load pad and includes urging means for urging the shaft against the socket in the load pad. The load pad is provided with at least one and preferable a pair of retention hooks extending from one or more sides of pad, the hook or hooks being flexible to allow insertion of the load pad through the frame aperture and the hook having a finger portion operative after insertion to engage the underside of the frame in response to said urging means so as to prevent the load pad from being ejected from the aperture. Thus, during manufacturing, the support frame may be freely handled or shipped to remote locations without fear of loss of the load pads. When a magnetic head is mounted in place over the load pad, the pressure of the head against the pad causes the finger portions of the retention hooks to disengage from the frame thereby allowing the pad the freedom to intimately engage with the surface of the magnetic head.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
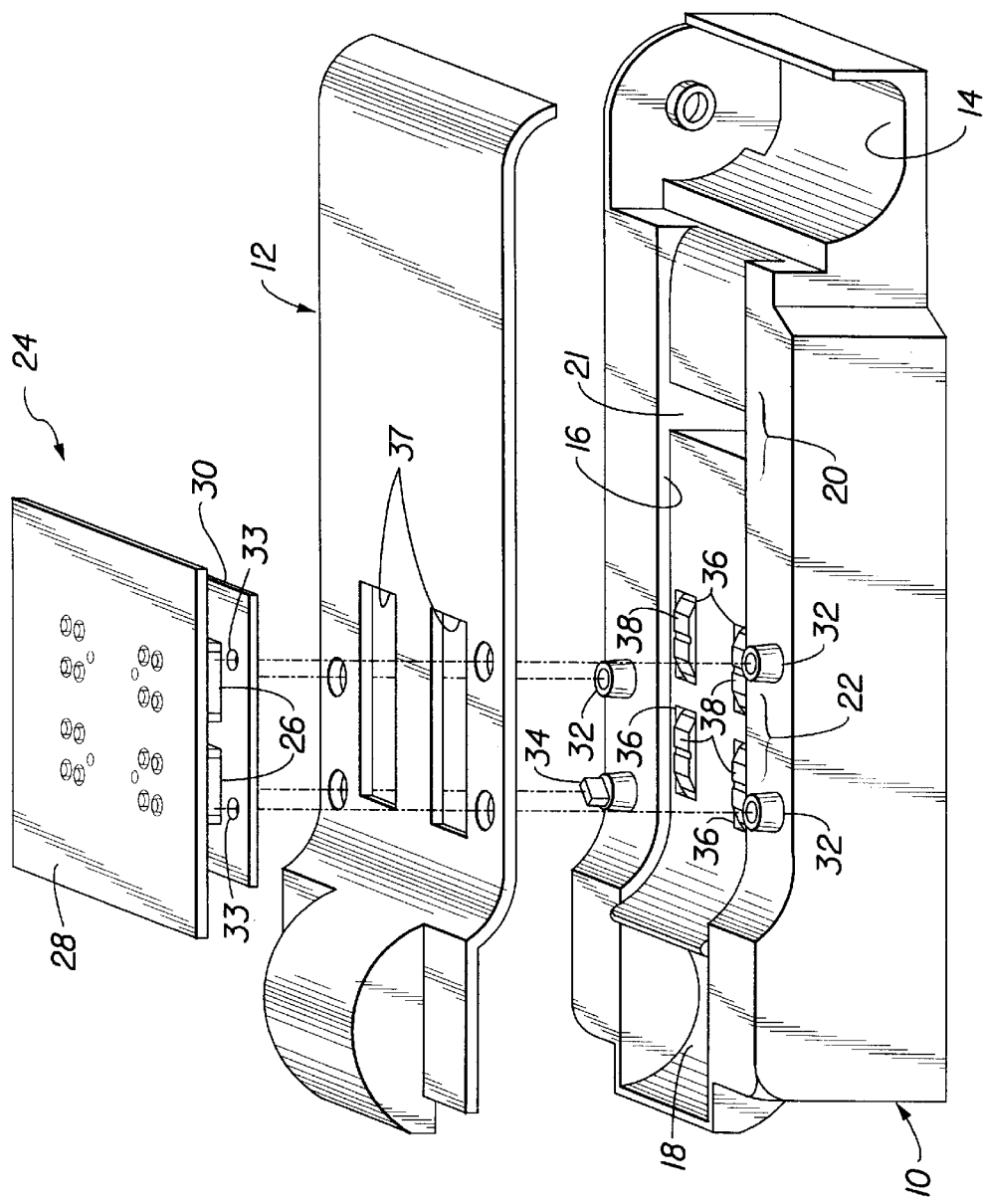
FIG. 1 is an exploded perspective view of a portion of an APS photographic film scanner illustrating a pair of magnetic head assemblies with load pad mounting arrangements according to the invention.

In FIG. 1, lower frame 10 and upper frame 12 comprise in internal framework assembly of an APS photographic apparatus such as a camera or film scanner. When assembled together, the two frames form a film cartridge receiving chamber 14, a film channel 16 and a film takeup chamber 18. When an APS film thrust cartridge is inserted into chamber 14, a spool drive mechanism (not shown) operates to rotate the spool of the cartridge to initially thrust the film into the film channel 16 towards the takeup chamber 18. Part of the drive mechanism includes drive rollers (not shown) in the vicinity a film scanning station 20 to drive the film over a scanning aperture 21 formed in the scanning station and through a magnetic data read/write station 22. The magnetic station 22 includes a magnetic head assembly 24 comprising magnetic heads 26 mounted on a printed circuit board 28 and rigidly fixed in relative position by means of a metal mounting plate 30. The magnetic head assembly 24 is mounted on the lower frame 10 by means of screws extending upwards through bosses 32 into threaded holes 33 on the metal plate 30. Pin 34 serves to aid in locating mounting plate 30 during the assembly process. The lower frame 10 is provided with four load pad apertures 36 which house load pads 38 as will be described in more detail below. Elongated apertures 37 in the upper frame 12 provide access by the magnetic heads 36 to the magnetic station 22. When assembled to the frame, the heads 26 are in alignment with respective load pad apertures 36 and are positioned along opposite side of the film channel so that data is read from or written to a magnetic layer on the film in film tracks extending longitudinally along opposite edges of the film. The pair of magnetic heads remote from the cartridge chamber 14 perform data reading functions and the pair of magnetic heads closest to the chamber 14 perform data writing functions. It is not believed to be necessary to describe in further details the film image scanning function and the magnetic data read/write functions since such details are not necessary for an understanding of the present invention.

As described in the aforementioned patent application, for optimum loading of the photographic film-based magnetic layer against the magnetic heads 26, the load pads are gimbaled on a spring loaded mounting shaft. It will be appreciated that the assembly process is hampered by the fact that the load pads are very small in size and the fact that the pads are loosely supported on their respective mount shafts. It is easy during assembly for the pads to fall out of the apertures before the magnetic head assembly is mounted in position over the pads. Additionally, it may be desirable for manufacturing cost efficiencies, to be able to assemble a portion of the scanner assembly at one location, in this case the lower frame assembly with the load pads in place, and to ship the assembly to another location for final assembly of the upper frame and magnetic head assembly. This other location might be another location in the same plant or it might be another plant entirely. For this reason it is highly desirable to provide for stable positioning of the gimbaled load pads in their respective apertures to allow such handling and transfer of subassemblies.

Figure 2:
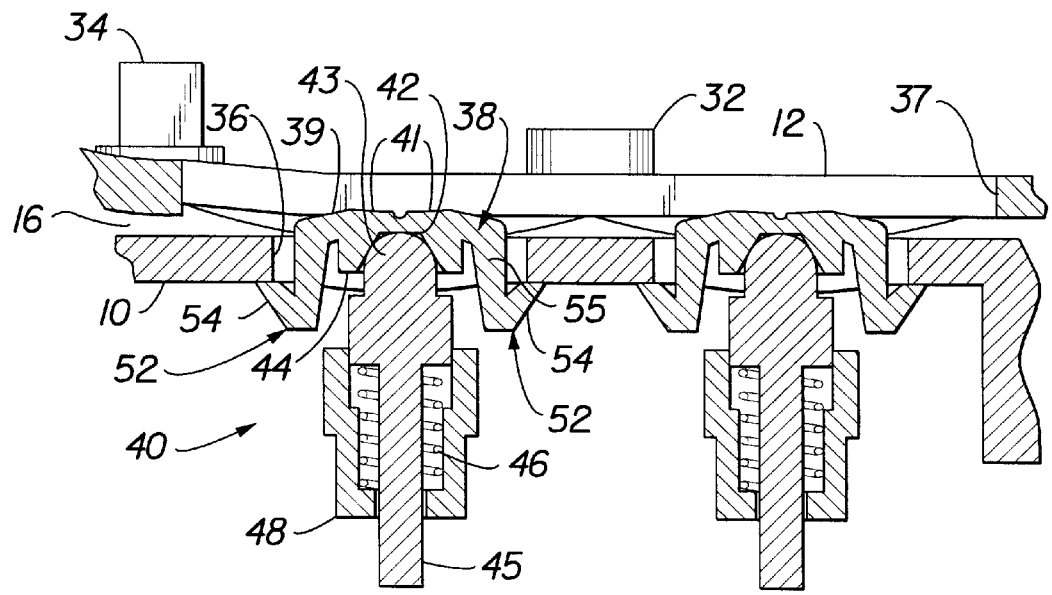
FIG. 2 is a side section view of the load pad mounting arrangement of the invention without the magnetic heads being mounted in position.
Figure 5:
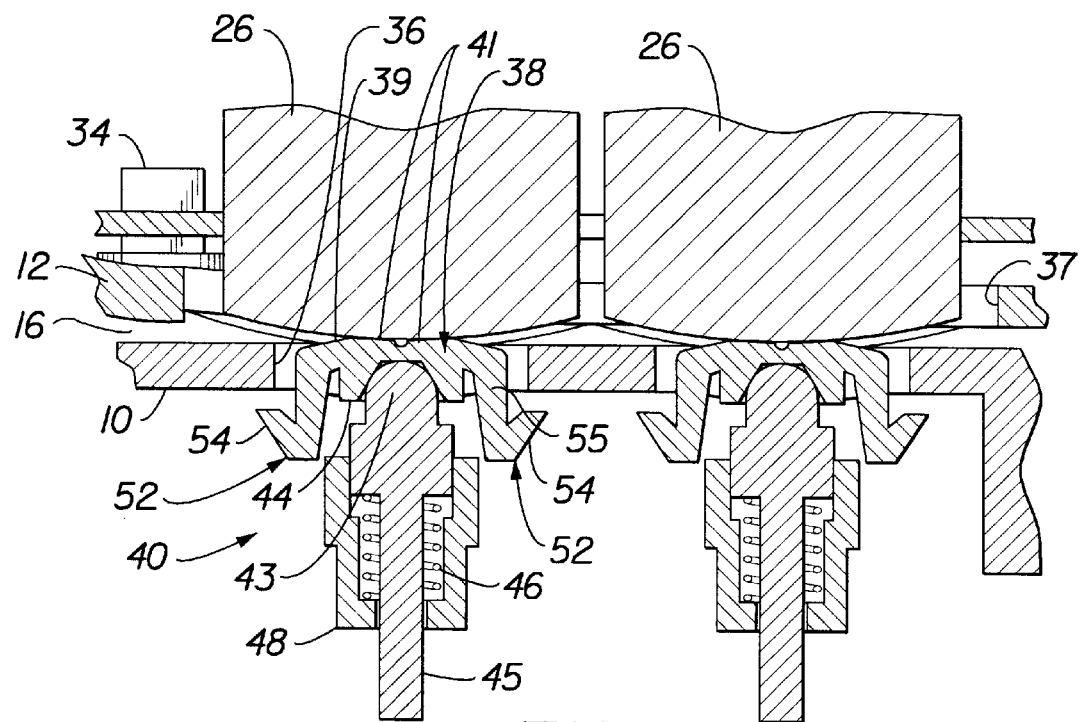
FIG. 5 is a side section view of the load pad mounting arrangement with the magnetic heads mounted in position pressing against the upper surfaces of the load pads.
Figure 3:
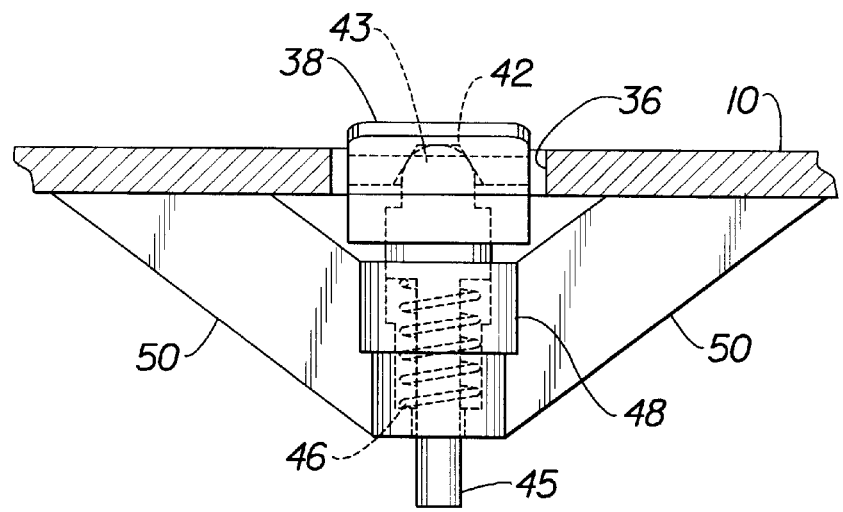
FIG. 3 is a side view of the load pad mounting arrangement of the invention illustrating one embodiment for attaching the mounting arrangement to the underside of the scanner frame.
Figure 4:
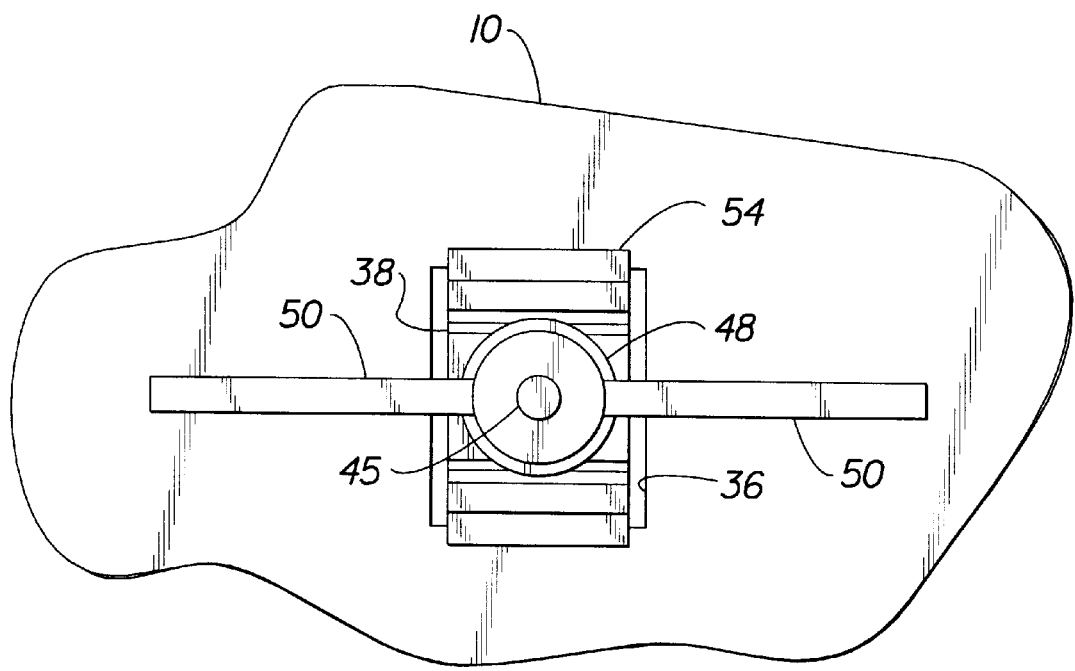
FIG. 4 is a bottom view of the FIG. 3 mounting arrangement.

Turning now to FIGS. 2–5, the solution to this problem will now be described in detail. In FIG. 2, there is shown a pair of load pad assemblies constructed in accordance with the insertion and as found on either side of the film track 16 in FIG. 1. For present purposes, it is sufficient to describe only a single assembly since all four are preferably the same in structure. Thus, load pad assembly 50 is shown positioned in aperture 36 formed in the surface of frame 10 within film channel 16. The load pad assembly 40 includes a load pad 38 having an upper surface 39 preferably formed with two spaced apart humps 41 which aid in stretching the film magnetic layer into good contact with the magnetic head as the film passes through the magnetic station. The lower surface 44 of the load pad 38 is provided with a socket 42 which mates with a spherical end 43 of mounting shaft 44. A compression spring 46 serves as urging means for urging the shaft against the socket. Means for supporting the load assembly on the underside of the frame comprises a support housing 48 held in place by arms 50 FIGS. 3 and 4. In accordance with the present invention, load pad 38 is provided with at least one flexible, i.e. deformable, retention hook 52 extending from a side of the load pad 38. In a preferred embodiment of the invention, a second retention hook is also formed on the opposite side of the pad. The retention hooks include downwardly projecting arms 55 and finger portions 54 which are splayed outwardly of the load pad. The arms 55 and finger portions 54 are sufficiently flexible and springy to allow the pad 38 to be inserted in aperture 36 with the finger portions 52 engaging the underside of the frame 10 after insertion of the assembly components into the aperture. The compressive force of spring 46 is sufficient to hold the finger portions of the hooks in contact with the underside of the frame 10 to prevent the load pads from being accidentally ejected out of the aperture during assembly prior to mounting of the magnetic heads. As such, the lower frame assembly may be handled and shipped as unit without fear of loss of the gimbaled load pad assembly. As shown in FIG. 5, once the magnetic heads are mounted in position over the load pads, the spring 46 is compressed by an amount sufficient to release the finger portions from contact with the frame underside thereby allowing the load pad 38 the freedom to move and to assume its desired exactly constrained contact with the magnetic head 26.

The invention has been described in detail with particular reference to certain preferred embodiments thereof, but it will be understood that variations and modifications can be effected within the spirit and scope of the invention.

PARTS LIST 10 lower frame
12 upper frame
14 film cartridge receiving chamber
16 film channel
18 film takeup chamber
20 film scanning station
21 scanning aperture
22 magnetic data read/write station
24 magnetic head assembly
26 magnetic heads
28 printed circuit board
30 metal mounting plate
32 mounting bosses
33 mounting screw holes
34 locating pin
36 load pad apertures
37 elongated apertures in frame 12
38 load pads
39 upper pad surface
40 load pad assembly
41 pad humps
42 socket
43 spherical end of shaft 44
44 lower pad surface
45 pad mounting shaft
46 compression spring
48 support housing
50 support arms
52 pad retention hook
54 finger portions
55 hook arms

What is claimed is:

1. A gimbaled load pad mounting arrangement comprising:

a frame having an aperture;

a load pad assembly inserted in the aperture, the load pad assembly including a load pad having an upper side adapted for engagement with a magnetic head and a lower side with a socket formed therein, a pad mounting shaft having a spherical end positioned in the socket of the load pad and urging means for urging the pad mounting shaft against the socket in the load pad; and means for supporting the load pad assembly on an underside of the frame;

the load pad having at least one retention hook extending from a side of pad, the hook being flexible to allow insertion of the load pad through the frame aperture and the hook having a finger portion operative after insertion to engage the underside of the frame in response to said urging means so as to prevent the load pad from being ejected from the aperture.

2. The mounting arrangement of claim 1 wherein said urging means is adapted to allow pressure of the magnetic head against the load pad to translate the hook finger portion out of contact with the underside of the frame to ensure that the load pad is exactly constrained against the magnetic head by virtue of gimballing function of the load pad socket against the spherical end of the pad mounting shaft.

3. The mounting arrangement of claim 1 wherein the load pad includes a pair of retention hooks extending respectively from opposite sides of the load pad.

* * * * *